US008967429B2

(12) United States Patent
Volonte et al.

(10) Patent No.: US 8,967,429 B2
(45) Date of Patent: Mar. 3, 2015

(54) COATING-POWDER-SUPPLY APPARATUS

(71) Applicant: J. Wagner AG, Altstatten (CH)

(72) Inventors: Luigi Carlo Maria Volonte, Valmadrera (IT); Leopold Von Keudell, Salem (DE)

(73) Assignee: J. Wagner AG, Altstatten (CH)

( * ) Notice: Subject to any disclaimer, the term of this patent is extended or adjusted under 35 U.S.C. 154(b) by 0 days.

(21) Appl. No.: 13/868,249

(22) Filed: Apr. 23, 2013

(65) Prior Publication Data

US 2013/0243535 A1 Sep. 19, 2013

Related U.S. Application Data

(62) Division of application No. 12/700,872, filed on Feb. 5, 2010, now Pat. No. 8,444,351.

(30) Foreign Application Priority Data

Feb. 9, 2009 (EP) .................................. 09405024

(51) Int. Cl.
| B67B 7/00 | (2006.01) |
| G01F 11/00 | (2006.01) |
| B67D 1/00 | (2006.01) |
| B67D 1/08 | (2006.01) |
| B65G 69/06 | (2006.01) |
| B67D 7/06 | (2010.01) |
| B65G 53/34 | (2006.01) |
| B05B 7/14 | (2006.01) |

(52) U.S. Cl.
CPC .............. *B65G 53/34* (2013.01); *B05B 7/1404* (2013.01); *B05B 7/1463* (2013.01); *B05B 7/1472* (2013.01)

USPC .................. 222/58; 222/1; 222/148; 222/195

(58) Field of Classification Search
USPC ................ 222/58.1, 148, 160, 195, 630, 637; 177/119, 145, 238; 406/24, 32, 73, 90, 406/114, 115, 141, 146
See application file for complete search history.

(56) References Cited

U.S. PATENT DOCUMENTS

| 532,731 A | 1/1895 | Helmer |
| 1,377,695 A | 5/1921 | Kors |
| 2,225,622 A | 12/1940 | Clapp |
| 2,330,596 A | 9/1943 | Kotcher |

(Continued)

FOREIGN PATENT DOCUMENTS

| DE | 43 44 701 | 9/1995 |
| DE | 10 2005 056 006 B4 | 7/2006 |

(Continued)

OTHER PUBLICATIONS

European Search Report for corresponding Application No. 09 405 024.2 dated Jun. 10, 2009.

(Continued)

*Primary Examiner* — Paul R Durand
*Assistant Examiner* — Vishal Pancholi
(74) *Attorney, Agent, or Firm* — Renner, Otto, Boisselle & Sklar, LLP

(57) ABSTRACT

The coating-powder-supply apparatus according to the invention comprises a powder-storage container, a powder conveyor, in order to convey powder out of the powder-storage container, and a set of scales, in order to weigh the powder located in the powder-storage container.

15 Claims, 6 Drawing Sheets

(56) References Cited

U.S. PATENT DOCUMENTS

| | | |
|---|---|---|
| 2,482,146 A | 9/1949 | Baker |
| 2,953,959 A | 9/1960 | Weinert |
| 2,969,632 A | 1/1961 | Carew |
| 3,472,430 A | 10/1969 | Corbett et al. |
| 3,536,449 A | 10/1970 | Astle |
| 4,109,027 A | 8/1978 | Crose |
| 4,346,818 A | 8/1982 | Bösmiller |
| 5,287,897 A | 2/1994 | Gamberini |
| 5,722,802 A | 3/1998 | March |
| 5,782,382 A | 7/1998 | Van Marcke |
| 6,188,936 B1 | 2/2001 | Maguire et al. |
| 6,481,993 B1 | 11/2002 | Kohara et al. |
| 6,494,645 B1 | 12/2002 | Seitz et al. |
| 6,810,929 B1 | 11/2004 | Tansey et al. |
| 7,452,166 B2 | 11/2008 | Von Keudell et al. |
| 7,530,505 B2 | 5/2009 | Von Keudell et al. |
| 2002/0092468 A1 | 7/2002 | Mauchle et al. |
| 2002/0139301 A1 | 10/2002 | Attinoto et al. |
| 2008/0187423 A1 | 8/2008 | Mauchle et al. |
| 2008/0257257 A1 | 10/2008 | Mauchle et al. |

FOREIGN PATENT DOCUMENTS

| | | |
|---|---|---|
| DE | 10 2005 006 522 B3 | 8/2006 |
| DE | 10 2005 060 833 A1 | 6/2007 |
| EP | 0 029 236 | 5/1981 |
| EP | 1 222 963 | 7/2002 |
| EP | 1 953 098 | 8/2008 |
| WO | 2008/028613 | 3/2008 |

OTHER PUBLICATIONS

Co-pending U.S. Appl. No. 12/700,872, filed Feb. 5, 2010 (current claims and application provided).

COATING-POWDER-SUPPLY APPARATUS

CROSS-REFERENCE TO RELATED APPLICATION

The present application claims priority under 35 U.S.C. §119 to European Patent Application No. 09 405 024.2, filed on Feb. 9, 2009, the entire disclosure of which is incorporated herein by reference.

TECHNICAL FIELD

The invention relates to a coating-powder-supply apparatus and to a method of operating the coating-powder-supply apparatus.

In order to coat workpieces with coating powder, or powder for short, the powder is transported, with the aid of a powder-supply apparatus, to a powder spray gun and sprayed there onto the workpiece by means of the powder spray gun. The powder-coated workpiece is then heated, in which case the powder liquefies. Finally, the workpiece is cooled, and the powder hardens and forms a closed covering layer on the workpiece.

The powder-supply apparatus comprises a powder-storage container which serves for storing the coating powder. It additionally comprises a powder-conveying apparatus, by means of which the powder is extracted from the powder-storage container by suction and transported to the powder spray gun. The powder spray gun may be designed as a manual or automatic powder spray apparatus and has a spray nozzle or a rotary atomizer at its outlet, which is directed toward the workpiece.

DESCRIPTION OF THE RELATED ART

A powder-supply apparatus as described in the introduction is known from German Offenlegungsschrift DE 10 2005 060 833 A1.

SUMMARY OF THE INVENTION

It is an object of the invention to specify a coating-powder-supply apparatus and a method of operating the coating-powder-supply apparatus which render the quality of the coating of the workpiece constantly high.

The object is achieved by a coating-powder-supply apparatus having the features of claim 1.

The coating-powder-supply apparatus according to the invention comprises a powder-storage container, a powder conveyor, in order to convey powder out of the powder-storage container, and a set of scales, in order to weigh the powder located in the powder-storage container.

Advantageous developments of the invention can be gathered from the features specified in the dependent claims.

A development of the coating-powder-supply apparatus provides a holder which is intended for retaining the powder conveyor and is designed such that the powder conveyor is not also weighed by the set of scales.

In another development of the coating-powder-supply apparatus, the set of scales is arranged beneath the powder-storage container.

One embodiment of the coating-powder-supply apparatus provides a lifting arrangement in order to be able to move the powder-storage container upward and downward.

As an alternative to this, the coating-powder-supply apparatus may have a lifting arrangement in order to be able to move the powder conveyor upward and downward.

In another embodiment of the coating-powder-supply apparatus, the powder conveyor has an intake pipe and a suction-extraction arrangement with a suction-extraction opening through which the intake pipe projects.

A further embodiment of the coating-powder-supply apparatus provides a control means which is designed, and can be operated, such that it evaluates the measuring signal of the set of scales in order to determine the quantity of powder in the powder-storage container.

Furthermore, the coating-powder-supply apparatus may have a line in order to transport powder into the powder-storage container.

The coating-powder-supply apparatus according to the invention advantageously comprises a suction-extraction line in order to take in air by suction from the powder-storage container.

It is further possible, in the case of the coating-powder-supply apparatus, for the powder conveyor to have an intake line and for the powder-storage container, laterally, to have a powder-outlet opening, to which the intake line of the powder conveyor is connected.

In a development of the coating-powder-supply apparatus, the intake line is of a flexible design.

In another development of the coating-powder-supply apparatus, the powder-storage container has a fluidizing unit.

The coating-powder-supply apparatus according to the invention can be used in a powder-coating installation.

A powder-coating installation having the above described coating-powder-supply apparatus may comprise a further powder-storage container, in order to provide powder for the coating-powder-supply apparatus. It is additionally possible to provide a further set of scales, in order to weigh the powder located in the further powder-storage container.

Also proposed is a method of operating the coating-powder-supply apparatus in which the measuring signal generated by the set of scales is used in order to determine the quantity of powder located in the powder-storage container.

A further variant of the method of operating the coating-powder-supply apparatus provides that, at certain time intervals, the quantity of powder located in the powder-storage container and, from this, the change in the quantity of powder in the powder-storage container are determined.

In the method of operating the coating-powder-supply apparatus, provision may be made for the intake pipe of the powder conveyor to be moved out of the powder-storage container and, in the process, to be freed of powder which adheres to the intake pipe.

Finally, the invention proposes a method of operating the powder-coating installation in which, at certain time intervals, the quantity of powder located in the further powder-storage container and, from this, the total powder consumption are determined.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail hereinbelow by way of a number of exemplary embodiments and with reference to six figures, in which.

DETAILED DESCRIPTION OF THE INVENTION

First Embodiment

Figure 1:
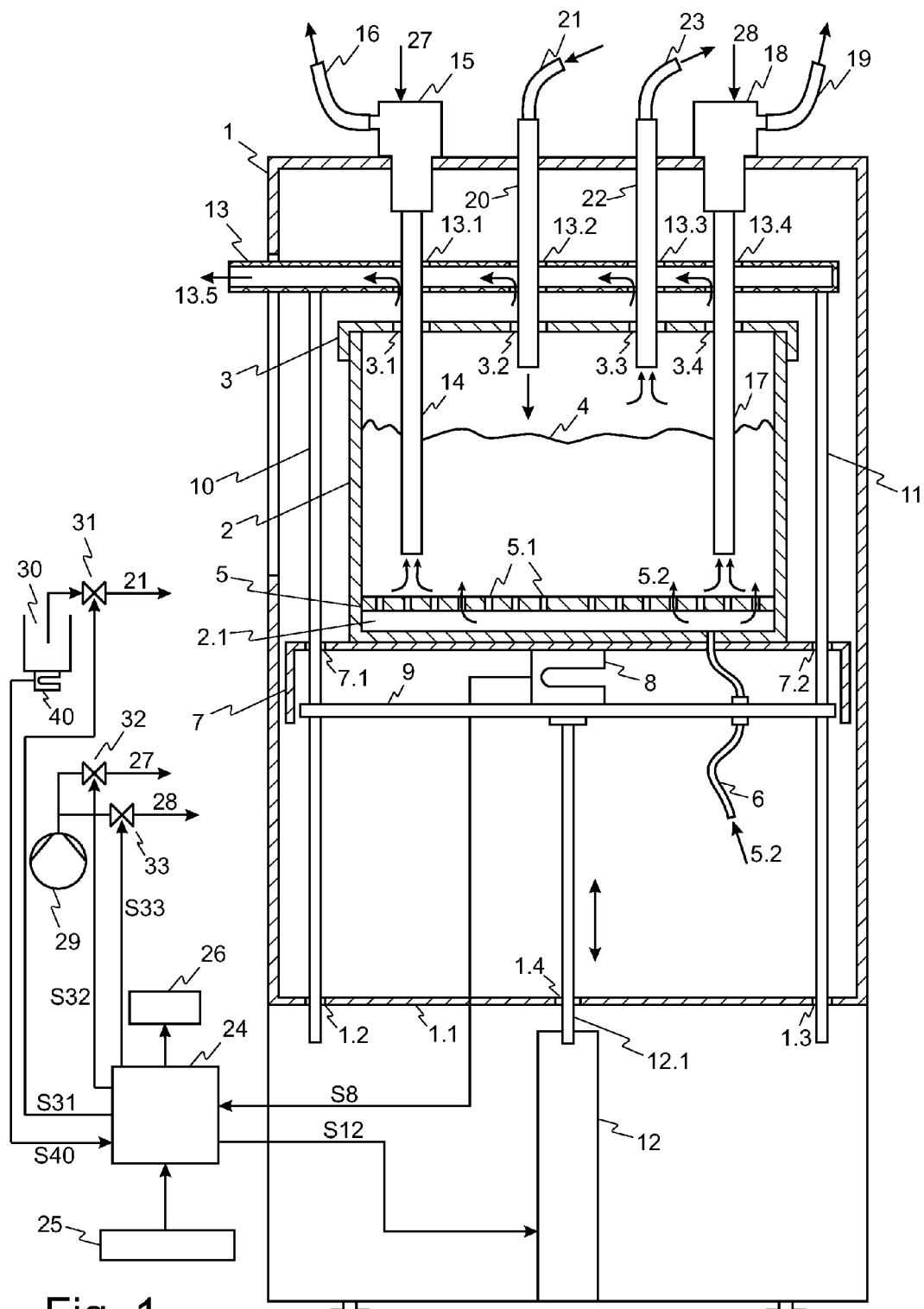
FIG. 1 shows the side view of a first possible embodiment of the coating-powder-supply apparatus according to the invention with the powder-storage container located in a first position.
Figure 2:
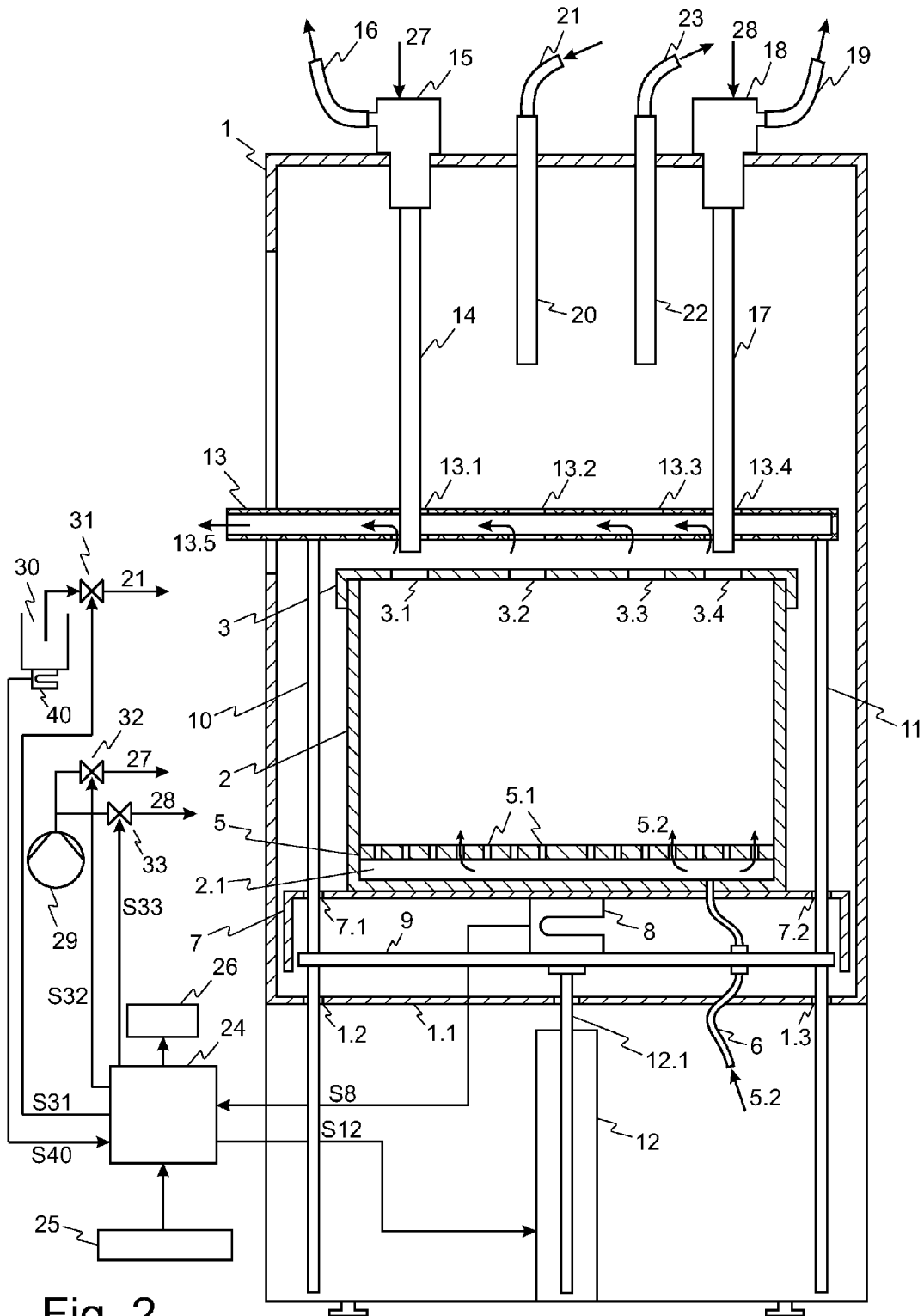
FIG. 2 shows the side view of the first embodiment of the coating-powder-supply apparatus according to the invention with the powder-storage container located in a second position.

The first embodiment of the coating-powder-supply apparatus will be explained in more detail hereinbelow with reference to FIGS. 1 and 2. FIGS. 1 and 2 illustrate the side view of the coating-powder-supply apparatus, partly in section.

The first embodiment of the coating-powder-supply apparatus according to the invention, which is illustrated in FIG. 1, comprises a housing 1 which, in turn, has an intermediate floor 1.1. Arranged beneath the intermediate floor 1.1 is a pneumatically driven cylinder 12 with a piston 12.1 which projects through an opening 1.4 in the intermediate floor 1.1 and carries a lower floor panel 9. A set of scales 8 is located between the lower floor panel 9 and an upper floor panel 7, which is arranged above, and parallel to, the lower floor panel. A powder-storage container 2 with a cover 3 stands on the upper floor panel 7. The housing 1 has, on its top side, openings through which project a first powder-conveying apparatus 15 with an intake pipe 14, a second powder-conveying apparatus 18 with an intake pipe 17, a powder pipe 20 and a suction-extraction pipe 22. It is also the case that the cover 3 of the powder-storage container 2 has, at the appropriate locations, openings 3.1, 3.2, 3.3 and 3.4, through which the two intake pipes 14 and 17 and the powder pipe 20 and the suction-extraction pipe 22 extend into the powder-storage container 2.

The powder-storage container 2 contains, in its interior, a double floor 5, which will also be referred to hereinbelow as a fluidizing floor. The fluidizing floor 5 forms, with the side walls and the floor of the powder-storage container 2, a fluidizing-air chamber 2.1. The fluidizing floor 5 has a series of small holes 5.1 through which fluidizing air 5.2 can flow into the powder-storage container 2 from beneath in order to fluidize the powder 4 located in the powder-storage container 2. Instead of the holes 5.1, it is also possible for the fluidizing floor 5 to have pores. The pores may be formed, for example, by a sintered plastics material.

The powder-conveying apparatus 15 and the powder-conveying apparatus 18 may be, for example, compressed-air-operated injectors, piston pumps, diaphragm pumps or vacuum conveyors.

A suitable injector is described, for example, in DE 10 2005 056 006 B4. The injector operates in accordance with the Venturi principle. A continuous conveying-air stream helps to generate, in the injector, a negative pressure, which results in powder being taken by suction from the powder-storage container and transported, together with the conveying-air stream, in the direction of the powder spray gun. In addition, the injector is fed metering air, in order to assist the operation of conveying the powder to the gun.

DE 10 2005 006 522 B3 describes a vacuum conveyor which is suitable as powder conveyor 15 or 18. The conveyor has an inlet valve, an outlet valve and a powder-conveying chamber formed from an elastic conveying-chamber hose. The powder-conveying chamber is arranged between the inlet valve and the outlet valve and has a conveying-air inlet. The volume of the powder-conveying chamber can be changed by virtue of the conveying-chamber hose being deformed.

The powder 4 conveyed out of the powder-storage container 2 by the powder-conveying apparatus 15 is transported in the direction of the powder spray gun through a powder hose 16, which is connected to the powder-conveying apparatus 15. The powder 4 conveyed out of the powder-storage container 2 by the powder-conveying apparatus 18 is transported to a further powder spray gun through a powder hose 19, which is connected to the powder-conveying apparatus 18.

That embodiment of the coating-powder-supply apparatus which is shown in FIG. 1 additionally comprises a suction-extraction pipe 13, with four suction-extraction openings 13.1, 13.2, 13.3 and 13.4. The intake pipe 14 projects through the first suction-extraction opening 13.1, the powder pipe 20 projects through the second suction-extraction opening 13.2, the suction-extraction pipe 22 projects through the third suction-extraction opening 13.3, and the intake pipe 17 projects through the fourth suction-extraction opening 13.4. The suction-extraction pipe 13 is carried by two rods 10 and 11, which are arranged to the left and right of the powder-storage container 2. The two rods 10 and 11 project through corresponding openings 7.1 and 7.2 in the upper floor panel 7, without being in contact therewith, and are fastened on the lower floor panel 9. The lower ends of the two rods 10 and 11 are guided by way of two guides 1.2 and 1.3 in the intermediate floor 1.1, and this stabilizes the rods 10 and 11.

A control means 24 is provided in order to control the individual components of the coating-powder-supply apparatus. For this purpose, the control means 24 comprises a control circuit which is connected, at the input, to the set of scales 8 and of which the actuating signals at the output activate the pneumatic cylinder 12, a first valve 31, a second valve 32 and a third valve 33. In order for it to be possible to operate the control means 24, for example in order to set certain parameters, the control means is connected at the input to a keyboard 25, control buttons or the like. Furthermore, the control means 24 is connected at the output to a display 26. The display 26 can be used to display, for example, the operating state of the coating-powder-supply apparatus.

The operation of the coating-powder-supply apparatus illustrated in FIGS. 1 and 2 will be described hereinbelow. The measuring signal S8 generated by the set of scales 8 gives information in respect of the quantity of powder 4 which is located in the storage container 2. In order that the measurement carried out by the set of scales 8 is influenced as little as possible by disturbances, the two powder conveyors 15 and 18, with the associated intake pipes 14 and 17, and also the powder pipe 20 and the suction-extraction pipe 23 are not connected either to the storage container 2 or to the cover 3 thereof. As can be gathered from FIG. 1, they project into the storage container 2 without coming into contact with the cover 3. It is also the case that the suction-extraction pipe 13 does not come into contact with either the storage container 2 or the cover 3 thereof. The rods 10 and 11, which carry the suction-extraction pipe 13, do not come into contact with the storage container 2 or the cover 3 thereof or the upper floor 7. This construction ensures that the measuring signal S8 of the set of scales 8 records merely the weights F generated by the storage container 2, the cover 3 and the powder 4 located in the storage container.

The set of scales 8 may be equipped, for example, with strain gauges. The deformation to which the strain gauges are subjected by the weights F which have just been mentioned then generate the electric signal S8 at the exit of the set of scales 8.

As long as powder is being conveyed to the powder spray guns by the coating-powder-supply apparatus—this operating state will be referred to hereinbelow as the conveying operation—the powder-storage container 2 is located in the upper position, which is shown in FIG. 1.

The control means 24 determines, from the measuring signal S8, the filling level in the storage container 2 and, in dependence thereon, controls the cylinder 12 with the aid of the control signal S12, the valve 31 with the aid of the control signal S31, the valve 32 with the aid of the control signal S32 and the valve 33 with the aid of the control signal S33.

If it is intended, during conveying operation, for example for powder to be conveyed from a fresh-powder container 30, via the powder hose 21 and the powder pipe 20, into the powder-storage container 2, the valve 31 is opened by the actuating signal S31. The overspray which accumulates during coating of the workpieces can be extracted by suction from the coating cabin, recovered by a cyclone (not shown in the figures) and transported back into the fresh-powder container 30.

Instead of the feed line of the valve 31 being connected to the fresh-powder container 30, it is also possible for this feed line to be connected to the exit of the cyclone. In this way, overspray which has accumulated during coating of the workpieces, and has been recovered in the cyclone, can be conveyed from the cyclone, via the valve 31, the powder hose 21 and the powder pipe 20, into the powder-storage container 2.

The fresh-powder container 30, which will also be referred to hereinbelow as the further powder-storage container, advantageously stands on a set of scales 40, which may be constructed similarly to, or in the same way as, the set of scales 8. The set of scales 40 measures the weight of the fresh-powder container 30 and of the quantity of powder which is present in the fresh-powder container 30. Calibration makes it possible for the dead weight of the fresh-powder container 30 to be subtracted from the weight which has been determined by the set of scales 40, and this ultimately allows the variable which is actually of interest, in other words the quantity of powder in the fresh-powder container 30, to be determined. This calculation takes place in the control means 24.

If it is also the case that the overspray, as described above, is fed to the fresh-powder container 30 again, the control means 24 can be used to determine the total quantity of powder consumed during coating. Knowledge of the total powder consumption is beneficial, for example, if there is a desire to know how high the day's consumption of powder was or how much powder was consumed in respect of a certain color or of a certain batch or job size. The total powder consumption is determined by virtue of the set of scales 40 and of the control means 24 being used to determine the quantity of powder $P(t1), P(t2) \ldots P(tn)$ in the fresh-powder container 30 at different points in time $t1, t2 \ldots tn$. The difference between the quantities of powder determined $$\Delta P(tx,ty)=P(tx)-P(ty)$$

then gives the quantity of powder consumed between the points in time tx and ty. For example, the difference between the quantities of powder $\Delta P(t1, t2)=P(t1)-P(t2)$ determined thus gives the quantity of powder consumed between the points in time t1 and t2.

For the case where the powder conveyor 15 and the powder conveyor 18 are designed as injectors, they are operated as described in the following. During conveying operation, the valve 32 is opened by the actuating signal S32, in which case compressed conveying air, which emanates from a compressed-air source 29, flows through the open valve 32, and a compressed-air hose 27, to the powder conveyor 15. In addition, during conveying operation, the valve 33 is opened by the actuating signal S33, in which case the compressed conveying air, which emanates from the compressed-air source 29, flows through the open valve 33, and a compressed-air hose 28, to the powder conveyor 18. If no more powder is to be conveyed to the powder spray guns by the powder conveyors 15 and 18, the control means 24 causes the two valves 32 and 33 to be closed.

Fluidizing air 5.2 is blown, through a hose line 6, into the fluidizing-air chamber 2.1. From there, it flows, through the openings 5.1 in the fluidizing floor 5, into the powder 4, loosens the latter and ensures that the powder can be better taken in by suction through the intake pipes 14 and 17. The hose line 6 is fastened on the lower floor panel 9 and opens out into the powder-storage container 2. In this region, the hose line 6 is designed as a flexible hose in order that it does not influence the weighing operations carried out by the set of scales 8 during coating operations.

The control circuit which is implemented in the control means 24 ensures that the level of powder in the powder-storage container 2 remains constant. This is done in that the level of powder in the powder-storage container 2 is determined continuously by the set of scales 8 and the amount of fresh (and/or recovered) powder which flows through the powder pipe 20 into the powder-storage container 2 is the same as the amount of powder which is extracted by suction from the powder-storage container 2 by the powder conveyors 15 and 18. This has the advantage that the powder conveyors 15 and 18 can be operated under precisely constant ambient conditions, for example pressure, temperature and filling quantity. The control mechanism, however, can also take account of changing ambient conditions and control the powder conveyors 15 and 18 accordingly. This, in turn, results in the powder conveyors 15 and 18 conveying a constant quantity of powder, which has a positive effect on uniform quality of the coating of the workpiece. For this purpose, in addition to the two sets of scales 8 and 40, the coating-powder-supply apparatus may also have a pressure sensor, for sensing the air pressure in the powder-storage container 2, and a temperature sensor, for sensing the temperature in the powder-storage container 2, although these have not been illustrated in the figures.

The fluidizing air flowing into the powder-storage container 2 may give rise to excess air in the powder-storage container 2. This excess air is extracted by suction from the powder-storage container 2 through the suction-extraction pipe 22 and the hose 23, which is connected to the suction-extraction pipe 22. The excess air, which also entrains particles of powder, is usually fed to a centrifugal cyclone separator, and the powder contained in the excess air can therefore be recovered.

Before the coating-powder-supply apparatus operates in coating mode, a calibration is advantageously carried out. This makes it possible to calculate the weight of the storage container 2, of the cover 3 and further undesired variables, in which case the actual quantity of powder in the powder-storage container 2 can be determined precisely.

The calibration can be carried out, for example, as follows. First of all, the empty powder-storage container 2 with the lid 3 is positioned on the upper floor 7, weighed by the set of scales 8 and the result, which corresponds to a first measured value, is stored in the control means 24. Then a first standard weight is introduced into the powder-storage container 2 and a renewed measurement is carried out by the set of scales 8. The result, which corresponds to a second measured value, is likewise stored in the control means 24. In a third step, a second standard weight is introduced into the powder-storage container 2 and a renewed measurement is carried out by the set of scales 8. The result, which corresponds to a third measured value, is likewise stored in the control means 24. Using the three measured values, it is then possible to determine, by means of interpolation, a measurement curve which shows which measured value corresponds to which quantity of powder.

In order to empty the powder-storage container 2 of the coating-powder-supply apparatus, the coating-powder-supply apparatus can be operated in coating mode until such time as there is no more powder taken in by suction by the powder conveyors 15 and 18. This emptying operation usually takes place when the coating cabin no longer contains any workpiece for coating. The powder is then extracted by suction again from the coating cabin, via the cyclone, and fed to the fresh-powder-storage container 30.

If it is then intended for the coating-powder-supply apparatus to be cleaned—this operating state will be referred to hereinbelow as the cleaning operation—the powder-storage container 2, together with the upper floor 7, the set of scales 8 and the lower floor 9, is moved downward with the aid of the cylinder 12. The powder-storage container 2 is then, finally, located in the lower position, which is shown in FIG. 2.

During cleaning operation, the valves 32 and 33 are closed, in which the case the powder conveyors 15 and 18 are no longer in operation. The valve 31 is also closed, in which case there is no longer any powder being transported into the powder-storage container 2 via the powder pipe 20. As the powder-storage container 2 is moved downward, the two intake pipes 14 and 17 are guided past the suction-extraction openings 13.1 and 13.4, respectively, and the powder pipe 20 and the suction-extraction pipe 22 are guided past the suction-extraction openings 13.2 and 13.3, respectively, and the powder which adheres to the outside of the pipes 14, 17, 20 and 22 is extracted by suction through the suction-extraction pipe 13. The arrow 13.5 here indicates the flow direction of the suction-extracted air.

In order for the powder-storage container 2 and the cover 3 to be cleaned, it is also possible for these to be lifted out of the coating-powder-supply apparatus. If required, it is also possible for the powder-storage container 2 to be replaced by another powder-storage container.

Second Embodiment

Figure 3:
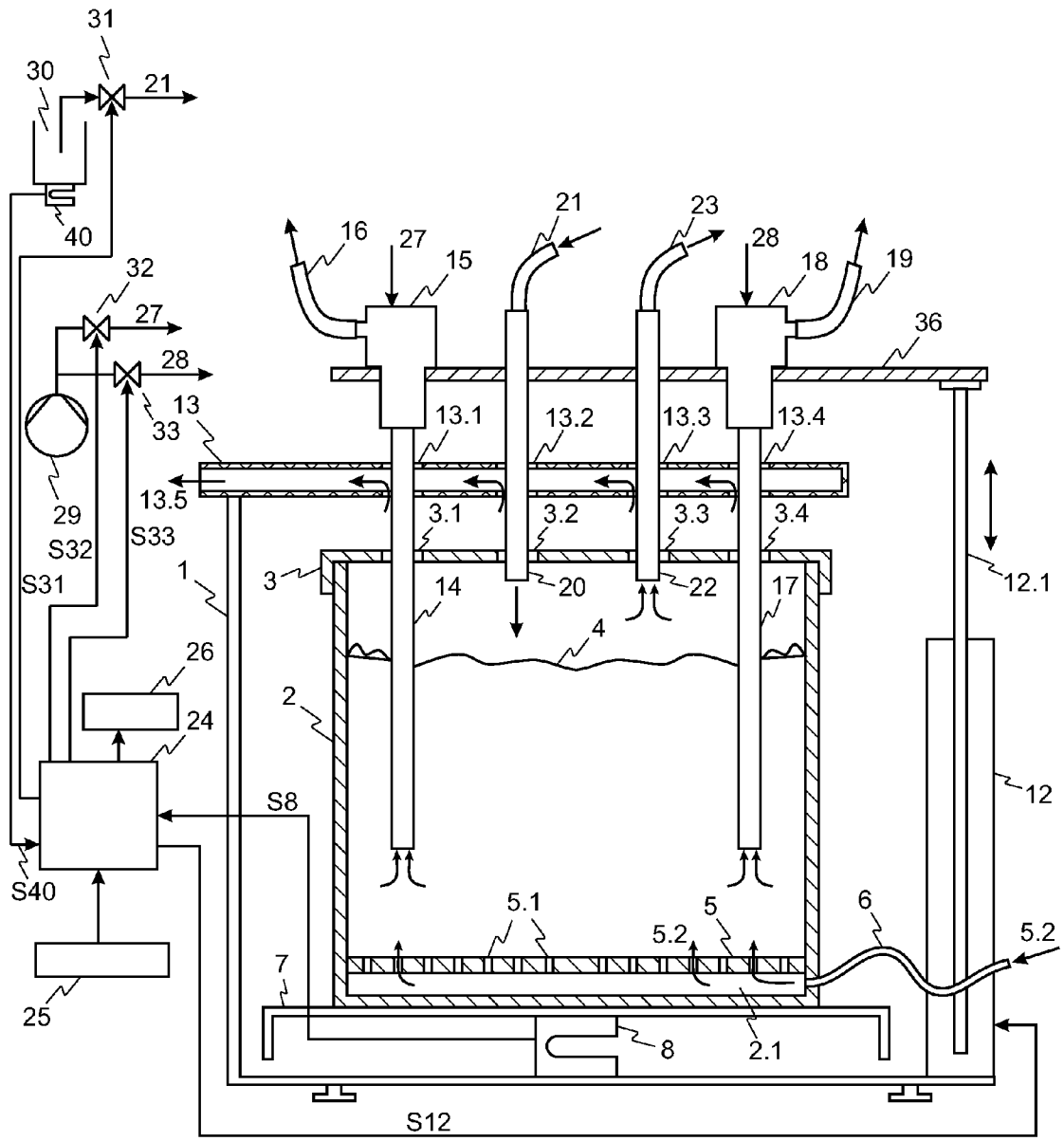
FIG. 3 shows the side view of a second possible embodiment of the coating-powder-supply apparatus according to the invention with the powder conveyors located in a first position.
Figure 4:
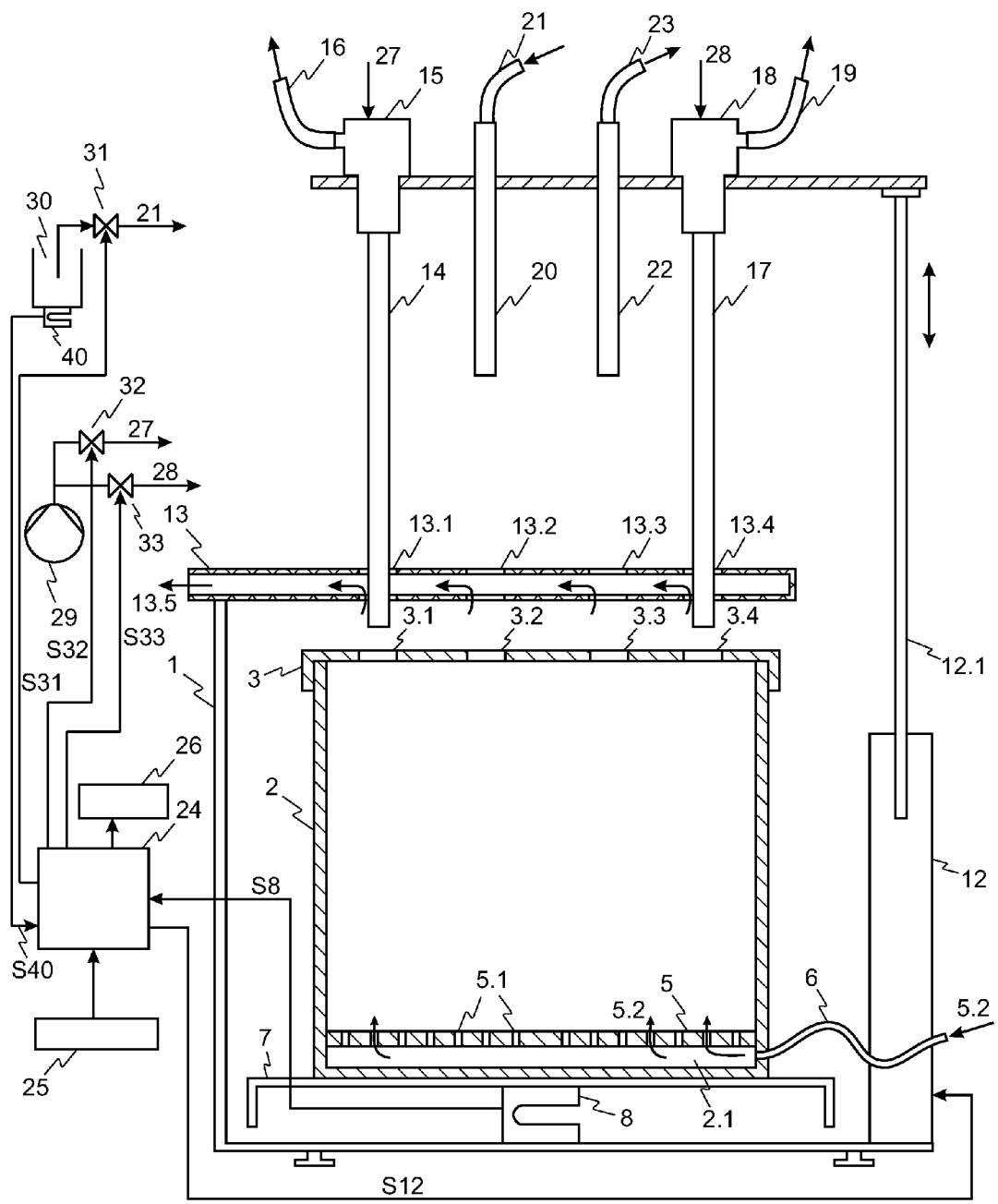
FIG. 4 shows the side view of the second embodiment of the coating-powder-supply apparatus according to the invention with the powder conveyors located in a second position.

The second embodiment of the coating-powder-supply apparatus will be explained in more detail hereinbelow with reference to FIGS. 3 and 4. The second embodiment of the coating-powder-supply apparatus differs structurally from the first embodiment of the coating-powder-supply apparatus, which is illustrated in FIGS. 1 and 2, in that during cleaning operation, rather than the powder-storage container 2 being moved downward, the powder conveyor 15 with the intake pipe 14 and the powder conveyor 18 with the intake pipe 17, and also the powder pipe 20 and the suction-extraction pipe 22, are drawn upward out of the powder-storage container 2. The two powder conveyors 15 and 18 and the powder pipe 20 and the suction-extraction pipe 22, for this purpose, are mounted on a carrier 36. The pneumatically operated cylinder 12 and piston 12.1 are arranged laterally alongside the powder-storage container 2 and move the carrier 36 optionally up or down.

During coating and during the emptying operation, the second embodiment operates in the same way as the first.

During cleaning operation, the valves 32 and 33 are closed, in which case the powder conveyors 15 and 18 are no longer in operation. The valve 31 is also closed, in which case there is no longer any powder being transported into the powder-storage container 2 via the powder pipe 20. As the two intake pipes 14 and 17 and the powder pipe 20 and the suction-extraction pipe 22 are moved upward by the piston 12.1, they are guided past the suction-extraction openings 13.1 to 13.4, and the powder which adheres to the outside of the pipes 14, 17, 20 and 22 is extracted by suction through the suction-extraction pipe 13. The arrow 13.5 here indicates the flow direction of the suction-extracted air. Toward the end of the lifting operation, the individual components are then located in the position which is shown in FIG. 4.

Since the two intake pipes 14 and 17 and the powder pipe 20 and the suction-extraction pipe 22 are moved, the suction-extraction pipe 13 may be arranged in a stationary manner.

Third Embodiment

Figure 5:
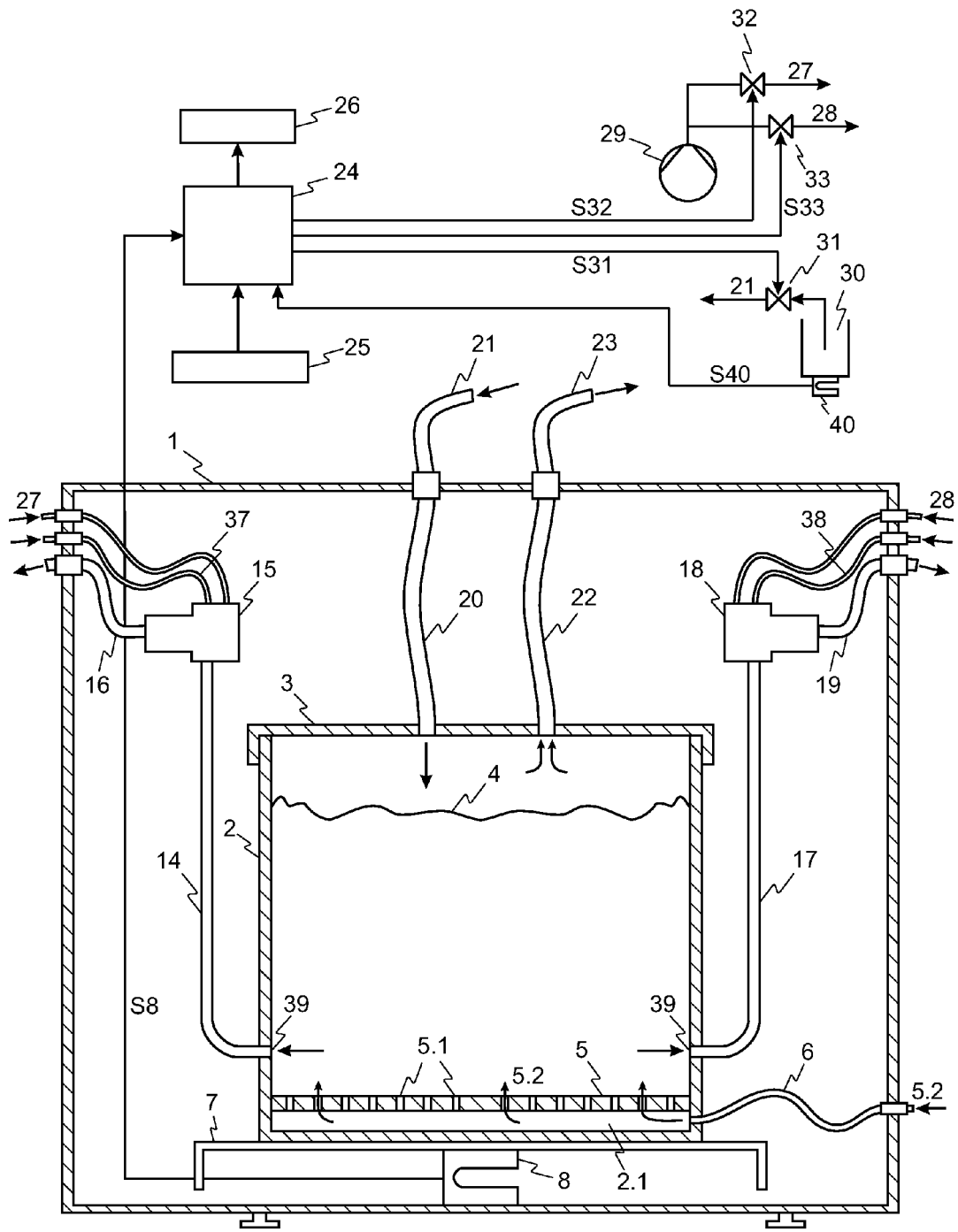
FIG. 5 shows the side view of a third possible embodiment of the coating-powder-supply apparatus according to the invention.

The third embodiment of the coating-powder-supply apparatus will be explained in more detail hereinbelow with reference to FIG. 5. The third embodiment of the coating-powder-supply apparatus differs structurally from the first and second embodiments of the coating-powder-supply apparatus in that neither the powder-storage container 2 nor the powder conveyors 15 and 18 are moved together with the intake pipe 14 and the powder pipe 20. The two powder conveyors 15 and 18 are connected rigidly to the powder-storage container 2 via the intake pipes 14 and 17, respectively. In its lower region, the powder-storage container 2 has, on each side, an opening 39 through which the intake pipes 14 and 17 can take in the powder from the storage container 2. The powder hose 16, which is connected to the powder conveyor 15, is fastened on the housing 1. The powder hose 19, which is connected to the powder conveyor 18, is likewise fastened on the housing 1. The two powder houses 16 and 19, between the powder conveyors 15 and 18, on the one hand, and the fastening locations on the housing 1, on the other hand, are flexible enough in order not to have any influence on the weighing operations which are carried out by the set of scales 8 during coating. Differential measurements carried out at various points in time can also compensate for the influence of the powder hoses 16 and 19. The same applies analogously to the powder hose 20, the suction-extraction hose 22, the hose for fluidizing air 6, the two conveying-air hoses 27 and 28 and to the metering-air hoses 37 and 38. Via the metering-air hose 37, the powder conveyor 15 is also fed metering air in addition to the conveying air. Via the metering-air hose 38, the powder conveyor 18 is also fed metering air in addition to the conveying air.

Since, in contrast to the first embodiment, the powder-storage container 2 is not moved and also, in contrast to the second embodiment, the intake pipes 14 and 17 are not moved, it is possible to dispense with a drive.

In coating operation and during the emptying operation, the third embodiment operates in the same way as the first and the second embodiments.

Fourth Embodiment

Figure 6:
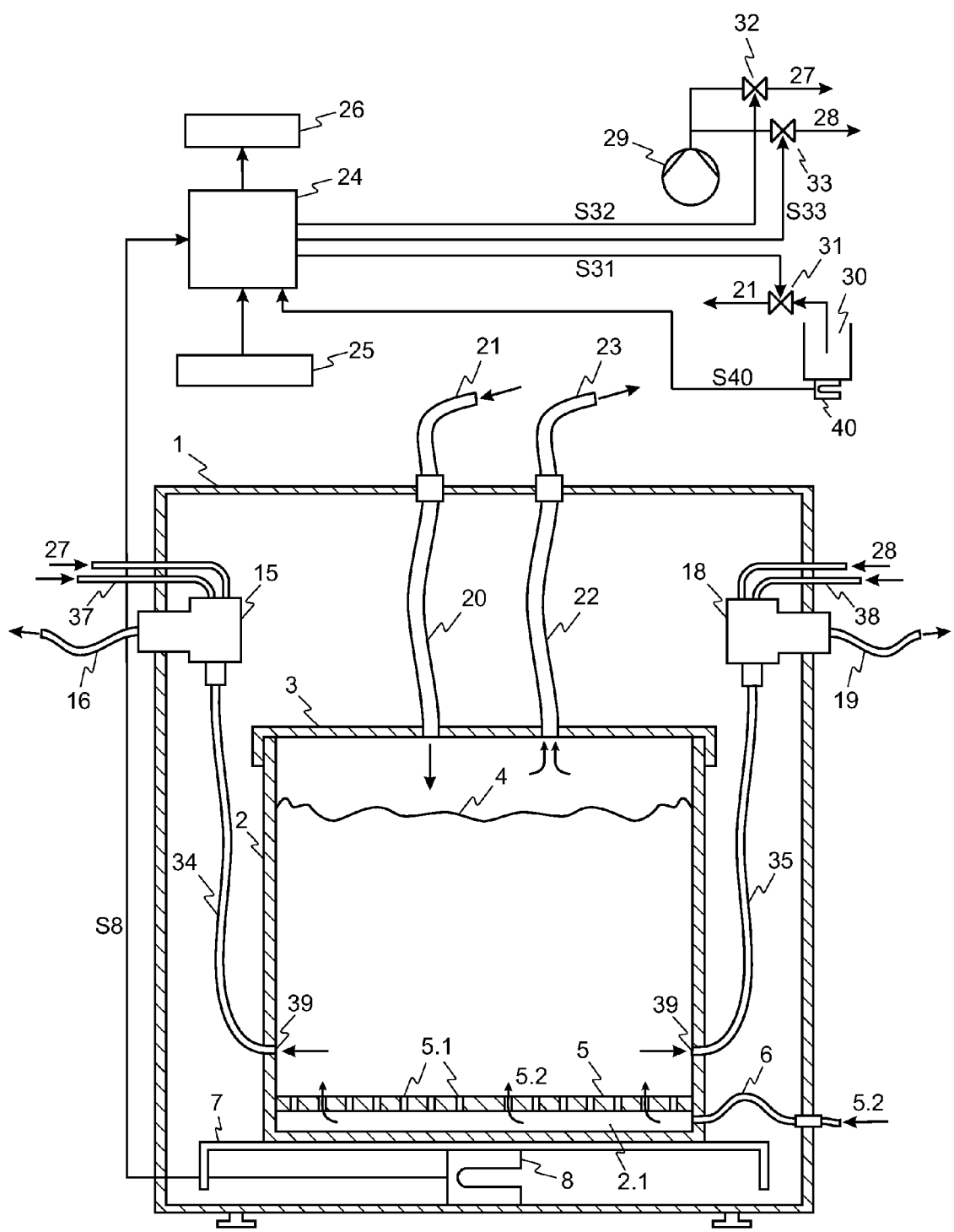
FIG. 6 shows the side view of a fourth possible embodiment of the coating-powder-supply apparatus according to the invention.

The fourth embodiment of the coating-powder-supply apparatus will be explained in more detail hereinbelow with reference to FIG. 6. The fourth embodiment of the coating-powder-supply apparatus differs structurally from the third embodiment of the coating-powder-supply apparatus, inter alia, in that the powder conveyors 15 and 18, here, are fastened on the housing 1 and the conveying-air lines 27 and 28 and the metering-air lines 37 and 38 are designed as pipes. In addition, intake hoses 34 and 35 are present here instead of the intake pipes 14 and 17. The intake hoses 34 and 35 are flexible enough in order not to have any influence on the weighing operations which are carried out by the set of scales 8 during coating. Differential measurements carried out at various points in time can also compensate for the influence of the intake hoses 34 and 35 on the weighing operation. For disruption-free measurement, it is advantageous if any forces between the powder conveyor 15 and the powder-storage container 2 and between the powder conveyor 18 and the powder-storage container 2 are avoided or are more or less constant, and therefore differential measurements can compensate for them.

During coating and during the emptying operation, the four embodiments operate in the same way.

The different embodiments have in common the fact that the filling level in the storage container 2 can be determined with the aid of the set of scales 8 and of the control means 24. For example a optical or acoustic signal can thus be emitted when the filling level in the storage container 2 falls below a minimum value or exceeds a maximum value. In addition, it is possible for the control means 24 to intervene automatically when a certain filling-level limit value is reached.

The above description of the exemplary embodiments according to the present invention serves only for illustrative purposes and not for the purpose of limiting the invention. Various amendments and modifications are possible within the context of the invention without departing from the scope of the invention and the equivalents thereof. It is thus also the case, for example, that embodiments with more than two powder conveyors are possible.

LIST OF REFERENCE NUMERALS

1 Housing
1.1 Intermediate floor
1.2 Opening
1.3 Opening
1.4 Opening
2 Powder container
2.1 Fluidizing-air chamber
3 Cover
3.1-3.4 Openings in the cover
4 Powder
5 Fluidizing floor
5.1 Fluidizing-air openings
5.2 Fluidizing air
6 Hose for fluidizing air
7 Upper floor panel
7.1 Bore
7.2 Bore
8 Set of scales
9 Lower floor panel
10 Rod
11 Rod
12 Pneumatic cylinder
12.1 Piston
13 Suction-extraction pipe
13.1-13.4 Suction-extraction slots
13.5 Flow direction of the suction-extraction air
14 Intake pipe
15 Powder pump
16 Powder hose
17 Intake pipe
18 Powder pump
19 Powder hose
20 Powder pipe
21 Powder hose
22 Suction-extraction pipe
23 Suction-extraction hose
24 Control means
25 Keyboard
26 Display
27 Conveying air
28 Conveying air
29 Compressed-air source
30 Storage container
31 Valve
32 Valve
33 Valve
34 Intake hose
35 Intake hose
36 Carrier
37 Metering-air hose
38 Metering-air hose
39 Outlet opening
40 Set of scales
S8 Measuring signal
S12 Actuating signal
S31 Actuating signal
S32 Actuating signal
S33 Actuating signal
S40 Measuring signal

The invention claimed is:

1. A coating-powder-supply apparatus, comprising:
a powder-storage container having a fluidizing unit,
a powder conveyor, in order to convey powder out of the powder-storage container to a spray gun,
a set of scales, in order to weigh the powder located in the powder-storage container, and
a lifting arrangement to move the powder conveyor upward and downward and for moving the powder conveyor out of the powder storage container.

2. A method of operating the coating-powder-supply apparatus as claimed in claim 1, wherein the powder conveyor has an intake pipe and the intake pipe of the powder conveyor is moved out of the powder-storage container and, in the process, is freed of powder which adheres to the intake pipe.

3. The coating-powder-supply apparatus as claimed in claim 1, wherein the set of scales is arranged beneath the powder-storage container.

4. The coating-powder-supply apparatus as claimed in claim 1, wherein the powder conveyor has an intake pipe, and comprising a suction-extraction arrangement with a suction-extraction opening through which the intake pipe projects.

5. The coating-powder-supply apparatus as claimed in claim 1, comprising:

a control means which evaluates a measuring signal of the set of scales in order to determine the quantity of powder in the powder-storage container.

6. The coating-powder-supply apparatus as claimed in claim 1, comprising:
a line to transport powder into the powder-storage container.

7. The coating-powder-supply apparatus as claimed in claim 1, comprising:
a suction-extraction line to take in air by suction from the powder-storage container.

8. A powder-coating installation having a coating-powder-supply apparatus as claimed in claim 1 comprising:
a further powder-storage container, to provide powder for the coating-powder-supply apparatus, and
a further set of scales, to weigh the powder located in the further powder-storage container.

9. A powder-coating installation comprising the use of the coating-powder-supply apparatus as claimed in claim 1 in a powder-coating installation.

10. A method of operating the coating-powder-supply apparatus as claimed in claim 1, wherein a measuring signal generated by the set of scales is used in order to determine the quantity of powder located in the powder-storage container.

11. A method of operating the coating-powder-supply apparatus as claimed in claim 1, wherein at certain time intervals, the quantity of powder located in the powder-storage container and, from this, the change in the quantity of powder in the powder-storage container are determined.

12. A method of operating the powder-coating installation as claimed in claim 8, wherein at certain time intervals, the quantity of powder located in the further powder-storage container and, from this, the total powder consumption are determined.

13. The coating-powder-supply apparatus as claimed in claim 1, wherein the fluidizing unit is formed at a base of the container.

14. The coating-powder-supply apparatus as claimed in claim 1, wherein the container has sidewalls and a floor, and wherein the fluidizing unit forms with the side walls and floor a fluidizing air chamber.

15. The coating-powder-supply apparatus as claimed in claim 14, wherein the fluidizing unit has a plurality of openings through which air flows into the container from the fluidizing air chamber.

* * * * *